Patented Mar. 10, 1931

1,795,918

UNITED STATES PATENT OFFICE

WILLIAM COURTNEY WILSON, OF CHICAGO, ILLINOIS, ASSIGNOR TO JOHN STOGDELL STOKES, OF HUNTINGDON VALLEY POST OFFICE, PENNSYLVANIA

PROCESS FOR REDUCING THE VISCOSITY OF NITROCELLULOSE SOLUTIONS

No Drawing. Application filed September 11, 1926. Serial No. 134,941.

This invention relates to a process for reducing the viscosity of nitrocellulose solutions by means of certain synthetic resins, and is especially useful where it is desired to obtain nitrocellulose solutions of high solid content having relatively low viscosities.

More particularly the object of this invention is to reduce the viscosity of nitrocellulose solutions without resorting to the expensive and comparatively hazardous processes that have heretofore been used. Another object is to provide solutions containing relatively large amounts of nitrocellulose and resins, which solutions have viscosities sufficiently low to make them suitable for use as protective coating materials, impregnating material, and other uses where it is desirable to use solutions containing comparatively large amounts of nitrocellulose and resin. Furthermore, this process provides a means of reducing the viscosity of nitrocellulose at a cost that is practically negligible compared to the other processes in which the nitrocellulose is given a special treatment in order to reduce the viscosity thereof. I wish also to employ such agents as do not have to be removed in a later step, or otherwise especially treated in order to render the solution suitable for use.

By careful experimentation, I have discovered that when certain synthetic resins of the phenolic condensation type are added to a viscous solution of regular soluble, unaltered nitrocellulose, the viscosity of the nitrocellulose solution is lowered. While there is considerable latitude in the choice of synthetic resins suitable for reducing the viscosity of nitrocellulose in my process, I have found that resins of the Durite type prepared from furfural and phenol as well as resins prepared from formaldehyde and phenol are particularly suited for my purpose since they will reduce the viscosity of nitrocellulose solutions very rapidly.

Since all phenolic resins do not reduce the viscosity of nitrocellulose solutions at the same rate, it is sometimes desirable to apply heat to the solutions in order to accellerate the lowering of the viscosity. This heating may be accomplished by any suitable method, as for example in a steam or water jacketed kettle. The temperature to which these solutions are heated is largely dependent on the solvents used. While it is possible to heat the material under pressure I prefer to avoid the hazard of such an operation, and heat under a return condenser to prevent the loss of solvent.

Many of the synthetic resins of the phenolic condensation type will lower the viscosity of the nitrocellulose solution so rapidly that a heating operation may be entirely dispensed with. It is only necessary to dissolve such resins in the viscous nitrocellulose solution in order to reduce the viscosity thereof. The resin may either be dissolved separately and added as a solution, or it may be incorporated directly at the time the nitrocellulose solution is being prepared, or the solid resin may be dissolved directly in the nitrocellulose solution. It is immaterial to the process as to the manner in which the nitrocellulose and resin are brought into the same solution. It is to be understood, of course, that the solvent, or solvent mixture should be a suitable solvent for both the nitrocellulose and the synthethic resin.

Such solutions of phenolic resins and nitrocellulose whose viscosity has been lowered by my process are admirably suited for use as protective coating material, since they combine the desirable properties of the synthetic resins with those of nitrocellulose. Protective coatings composed of these materials are very tough and flexible and show a remarkable resistance to weathering. Furthermore, this viscosity lowering process enables those skilled in the art to produce workable solutions which contain relatively large amounts of solids, without resorting to the higher priced types of especially treated low viscosity nitrocellulose. By a workable solution I mean a solution having a viscosity sufficiently low to render it capable of being applied as a protective coating by the ordinary methods such as with a hand brush or spray gun.

In practicing my invention it is most economical to use the ordinary unmodified forms of regular soluble nitrocellulose as a raw material. The viscosity of such unaltered forms of nitrocellulose is reduced by the phenolic resin so that the viscosity of the resulting solution will be substantially as low as would ordinarily be obtained by the use of special forms of low viscosity nitrocellulose. This results in a very substantial economy in making such solutions of nitrocellulose and resin, since the high viscosity types of nitrocellulose are cheaper, due to the fact that the processes at present employed for reducing the viscosity of nitrocellulose are costly, and the cost of such operations must be added to the price of the product.

In order to make my invention clearly understood, the following examples are given by way of illustration.

Example 1

A solution is made up consisting of:
185 parts by weight of regular soluble nitrocellulose
80 parts by weight of diamyl phthalate
450 parts by weight of denatured ethyl alcohol
310 parts by weight of toluol
150 parts by weight of ethyl acetate
400 parts by weight of butyl acetate To this nitrocellulose solution there is added 230 parts by weight of a 40% solution of a resinous condensation product of furfural and a phenolic body and known to the trade as Durite Resin No. 230. The solvent is ethyl alcohol. This material has no hardening agent such as formaldehyde or hexamethylenetetramine added thereto. Examples two and three show that the use of active methylene bodies tends to reduce the viscosity of the solutions to a greater extent. The mixture is then heated under a return condenser, or allowed to stand at room temperature until the desired reduction in viscosity has taken place.

The original viscosity of one such nitrocellulose solution was 43 minutes as measured on a flow viscosimeter. Upon the addition of the Durite resin solution the viscosity immediately dropped to 22 minutes. After standing for four days at room temperature the viscosity was 8 minutes and 20 seconds. After heating under a reflux condenser for 2½ hours, the viscosity was 1 minute and 35 seconds.

Example 2

A solution is made consisting of:
185 parts by weight of regular soluble nitrocellulose
230 parts by weight of a 40% solution of Durite No. 231, a resinous condensation product of furfural and a phenolic body with which has been incorporated about 10% of the resin weight of hexamethylenetetramine or a suitable quantity of formaldehyde, paraformaldehyde or other active methylene bodies, their polymers or hydrates
80 parts by weight of diamyl phthalate
450 parts by weight of denatured ethyl alcohol
310 parts by weight of toluol
150 parts by weight of ethyl acetate
400 parts by weight of butyl acetate The mixture is then heated or allowed to stand at room temperature until the desired reduction of viscosity has taken place.

The original viscosity of one such solution containing Durite No. 231 was 3 minutes and 58 seconds as measured on a flow viscosimeter. After standing two days at room temperature the viscosity was 2 minutes and 28 seconds.

Example 3

A solution containing nitrocellulose is made up as described in Example 1. To this solution there is added 230 parts by weight of a 55% solution of a resinous condensation product of one-fifth part by weight of hexamethylenetetramine and one part of commercial xylenol. The solvent is ethyl alcohol. Other active methylene bodies can be used in place of the hexamethylenetetramine as for example a suitable combining proportion of formaldehyde, its polymers and hydrates. The solution is then allowed to stand at room temperature, or heated in any suitable manner until the desired reduction of viscosity has taken place.

Upon the addition of the resinous solution to one such nitrocellulose solution, the viscosity dropped to 6 minutes and 54 seconds. After standing for two days the viscosity was 1 minute and 33 seconds. At the end of 4½ days the viscosity was 21 seconds, and at the end of 7 days 18 seconds, after which time the viscosity remained substantially constant.

In general, the greater the proportion of resin to nitrocellulose, the more rapid will be the reduction of the viscosity.

It should be understood that the above examples are given by way of illustration, and wide variations may be made in the solvents and diluents used, in the proportions of materials, and in the type of phenolic resin used without departing from the spirit of this invention. Furthermore it will be understood that modfiying agents such as plasticisers, coloring agents, stabilizers, inert fillers and the like may be used to produce a wide variety of products. Also in the case of potentially reactive resins, accelerators and hardening agents may be added which will cause the resin to become infusible after the evaporation of the solvent.

What I claim is—

1. The herein described process for lowering the viscosity of nitrocellulose solutions comprising the step of adding a phenolic condensation product including an active methylene body to the nitrocellulose lacquer whereby a solution of lower viscosity is obtained.

2. The herein described process for lowering the viscosity of nitrocellulose solutions comprising the step of adding a phenolic condensation product including hexamethylenetetramine to the nitrocellulose lacquer whereby a solution of lower viscosity is obtained.

3. The herein described process for lowering the viscosity of nitrocellulose solutions comprising the step of adding a phenolic condensation product including furfural and an active methylene body to the nitrocellulose lacquer whereby a solution of lower viscosity is obtained.

4. The herein described process for lowering the viscosity of nitrocellulose solutions comprising the step of adding a synethetic resin including furfural and hexamethylenetetramine to the nitrocellulose lacquer whereby a solution of lower viscosity is obtained.

5. The herein described process for lowering the viscosity of nitrocellulose solutions comprising the step of adding a furfural-phenol resinous condensation product to the nitrocellulose lacquer whereby a solution of lower viscosity is obtained.

6. The herein described process for lowering the viscosity of nitrocellulose solutions comprising the step of adding a synthetic resin including furfural and hexamethylene tetramine to the nitrocellulose lacquer, and heating said lacquer whereby a solution of lower viscosity is obtained.

7. A nitrocellulose solution of low viscosity characteristics comprising a nitrocellulose and a phenol-furfural resin including an active methylene hardening agent and a solvent mixture capable of holding the nitrocellulose and resin in solution.

Signed at Chicago, in the county of Cook and State of Illinois, the seventh day of September, A. D. 1926.

WILLIAM COURTNEY WILSON.